April 27, 1926.
S. O. F. A. SON BERGLUND
1,582,374
SYSTEM FOR RECORDING ACOUSTIC AND OTHER OSCILLATIONS
Filed Nov. 15, 1923
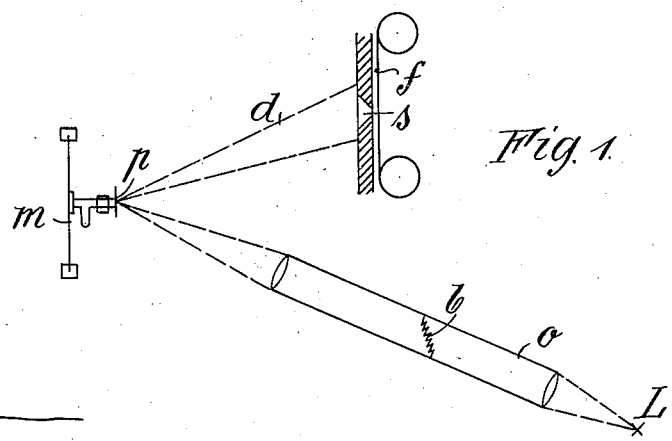
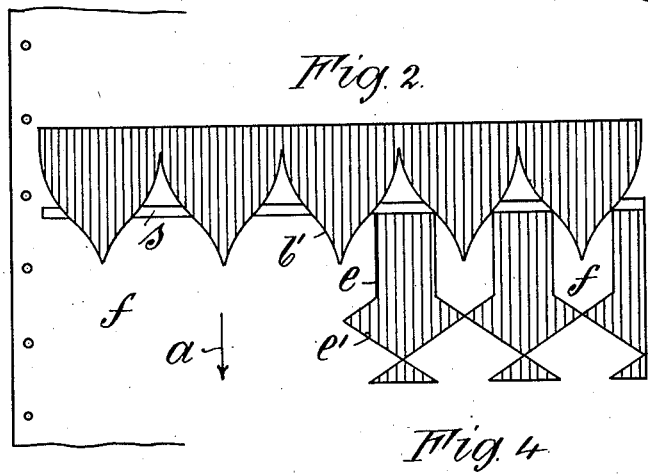
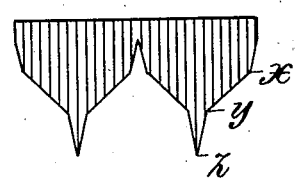
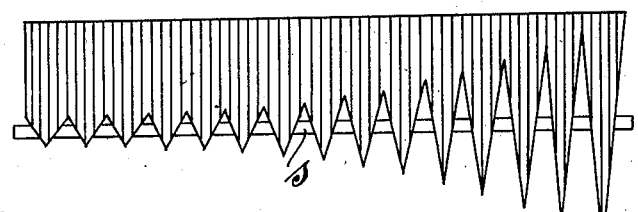
Witnesses:
Inventor:
Sven Oscar Fredrik
A. son Berglund.
by Edward C. Sasnett
Attorney.

Patented Apr. 27, 1926.

1,582,374

UNITED STATES PATENT OFFICE.

SVEN OSCAR FREDRIK A. son BERGLUND, OF BERLIN, GERMANY, ASSIGNOR TO AKTIEBOLAGET FILMFOTOFON, OF STOCKHOLM, SWEDEN, A CORPORATION OF SWEDEN.

SYSTEM FOR RECORDING ACOUSTIC AND OTHER OSCILLATIONS.

Application filed November 15, 1923. Serial No. 674,932.

*To all whom it may concern:*

Be it known that I, SVEN OSCAR FREDRIK A. SON BERGLUND, a citizen of Sweden, residing at Berlin, in the State of Prussia, Germany, have invented certain new and useful Improvements in Systems for Recording Acoustic and Other Oscillations; and I do hereby declare the following to be a full, clear, and exact description of the invention, such as will enable others, skilled in the art to which it appertains, to make and use the same.

My invention relates to improvements in systems for recording acoustic and other oscillations, and more particularly in systems of the class in which a mirror is connected with a member such as a diaphragm receiving the oscillations for being oscillated about an axis, which mirror throws the image of an object through a slot of a definite breadth and on a travelling sensitized film band, the breadth of the light effect on the film band depending on the amplitude of the oscillations of the mirror.

Systems of this class are used for example in cinematography for producing on a film band a record of sounds synchronously with the series of pictures produced thereon.

Apparatus of this class such as are now in use are not satisfactory in operation for the reason that the amplitudes of the oscillations of the diaphragm operating the mirror are not at the same ratio in case of deep sounds as in case of median and high sounds, the amplitude being considerably higher in case of deep sounds, so that a deep sound moves the mirror through an angle which is larger than it should be in view of the pitch of the sound. Therefore, the effect produced by the image on the film band is too long in the direction of the length of the slot.

The object of the improvements is to provide a system in which this objection is removed, and with this object in view my invention consists in using a shutter of a novel configuration producing the said image on the mirror, the configuration being such that thereby the difference of the amplitude is compensated. Within the median field of oscillations of the diaphragm and the mirror the lengths of the effect of the image on the film is proportional to the pitch of the sounds, and the self-oscillations of the diaphragm do not interfere with the recording of the acoustic oscillations. But within the field of the deep sounds a smaller length of the slot is covered by the image of the shutter as compared to that corresponding to the amplitude of the oscillation of the diaphragm.

In one embodiment of the invention within the field of the larger amplitudes of the oscillation of the diaphragm the curve of the influence of the shutter is made steeper so that the projection of the image of the curve thrown through the slot is comparatively narrow, and in another embodiment in case of large amplitudes of the oscillations of the diaphragm parts of the image of the shutter have no influence at all. Preferably, the curves of the outline of the shutter gradually merge into one another.

For the purpose of explaining the invention the said examples have been illustrated in the accompanying drawing, in which the same reference characters have been used in all the views to indicate corresponding parts. In said drawing, Fig. 1 is a diagram illustrating the system, Fig. 2 is a diagrammatic elevation on an enlarged scale showing the slot provided in front of the film band, the image produced in front of the slot, and the picture produced on the traveling film band by the oscillating image, Fig. 3 shows the form of the shutter and image in a diagrammatical way, and Figs. 4 and 5 show the said slot and modifications of the form of the shutter and image.

As appears from Fig. 1, the system comprises a source of light L, an objective system *o*, a shutter *b* having an outline similar in form to the outline of the image *b'* shown in Fig. 2, a diaphragm *m* adapted to be oscillated by acoustic or other impulses, a mirror *p* mounted on said diaphragm for being vibrated about an axis, a wall having a slot s the form of which is shown by way of example in Fig. 2, and means for running a film band f across the slot s.

In the operation of the system a pencil of rays is thrown by the source of light L and the objective system o on the mirror p and reflected to the slot s so as to produce an image of the shutter b, said image being shown in Fig. 2 on an enlarged scale, and a part of the image is thrown through the slot s and on the sensitized film f. The part of the film which is not covered by the parts of the image is exposed to the light rays emanating from the source L. As the film f travels across the slot s in the direction of the arrow a shown in Fig. 2 the exposed parts thereof will have the form of stripes e the border lines of which are parallel as long as the image b' is at rest. If, however, the mirror p is made to oscillate by the acoustic impulses imparted thereto by sounds acting on the diaphragm m, the outline of the image shown in Fig. 2 in the form of pointed figures is shifted more or less over the slot or withdrawn therefrom, so that the breadth of the stripes exposed to the light rays is varied, as has been indicated by way of example at the lower part of the exposed stripes at e'.

In the example shown in Figs. 2 and 3 the inclinations of the tangents passing through the successive points of the outline of the shutter and the image are different. For example, within the field of median amplitudes represented in Fig. 3 by the line x—y the inclination is substantially constant, and the curve of the contour is nearly rectilinear. However, within the field of larger amplitudes corresponding to the part y—z of the contour of the shutter or image the said contour is much steeper. Therefore a comparatively large displacement of the mirror and the image, the latter moving in a direction transverse of the slot s, has a reduced effect on the extent of the exposed portion of the film, the relative inclinations corresponding to the difference in the amplitudes of the oscillations of high, median, and deep sounds.

While in the example shown in Figs. 2 and 3 the configuration of the shutter is uniformly varied in all the portions of the shutter, Figs. 4 and 5 show a modification in which the adjacent portions of the shutter are different in length, so that in case of large amplitudes of the oscillation of the mirror a part of the portions of the image does not cover the slot at all, so that they have no influence on the film.

I claim:

1. A system for recording acoustic and other oscillations, comprising a mirror adapted to be vibrated in accordance with the oscillations, a partition having an opening for the passage of rays of light therethrough, means to move a sensitized surface across said opening at the side away from said mirror, a shutter, and means to throw an image of said shutter over the mirror on said partition at the part of the opening thereof, the configuration of said shutter being such that the effect of its image on the sensitized surface is reduced in case of oscillations of large amplitudes as compared to the effect produced in case of oscillations of small amplitudes.

2. A system for recording acoustic and other oscillations, comprising a mirror adapted to be vibrated in accordance with the oscillations, a partition having an opening for the passage of rays of light therethrough, means to move a sensitized surface across said opening at the side away from said mirror, a shutter, and means to throw an image of said shutter over the mirror on said partition at the part of the opening thereof, the configuration of said shutter comprising converging portions the outlines of which are steeper within the field of oscillations of larger amplitudes as compared to the outlines within the fields of smaller amplitudes.

3. A system for recording acoustic and other oscillations, comprising a mirror adapted to be vibrated in accordance with the oscillations, a partition having an opening for the passage of rays of light therethrough, means to move a sensitized surface across said opening at the side away from said mirror, a shutter, and means to throw an image of said shutter over the mirror on said partition at the part of the opening thereof, the configuration of said shutter comprising converging portions the lengths of which are reduced along the breadth of the opening from a maximum to a minimum.

4. A system for recording periodic oscillations comprising a travelling film located behind a partition provided with a narrow slit extending transversely to the film, means for projecting beams of light on the partition over the slit at the opposite side thereof to the film, and means responsive to the oscillations to be recorded for vibrating said beams transversely to said slit, the form of the beams being such that the area of film exposed thereto will vary at a certain rate in the case of oscillations within a predetermined amplitude while for greater oscillations the rate of change will be substantially less than said predetermined rate as the amplitude increases on both sides of the predetermined amplitude.

5. A system for recording acoustic oscillations comprising a travelling film located behind a partition provided with a narrow slit extending transversely to the film, means for projecting laterally spaced beams of light on the partition over the slit, said means including a mirror connected with a diaphragm, whereby the beams may be vibrated transversely to the slit in accordance with the acoustic oscillations to be recorded, the form of the beams being such that the area of film exposed thereto will vary at a certain rate in the case of oscillations within a predetermined amplitude while for greater oscillations the rate of change will be substantially less than said predetermined rate as the amplitude increases on both sides of the predetermined amplitude.

In testimony whereof I hereunto affix my signature.

SVEN OSCAR FREDRIK A. son BERGLUND.